Patented Mar. 28, 1944

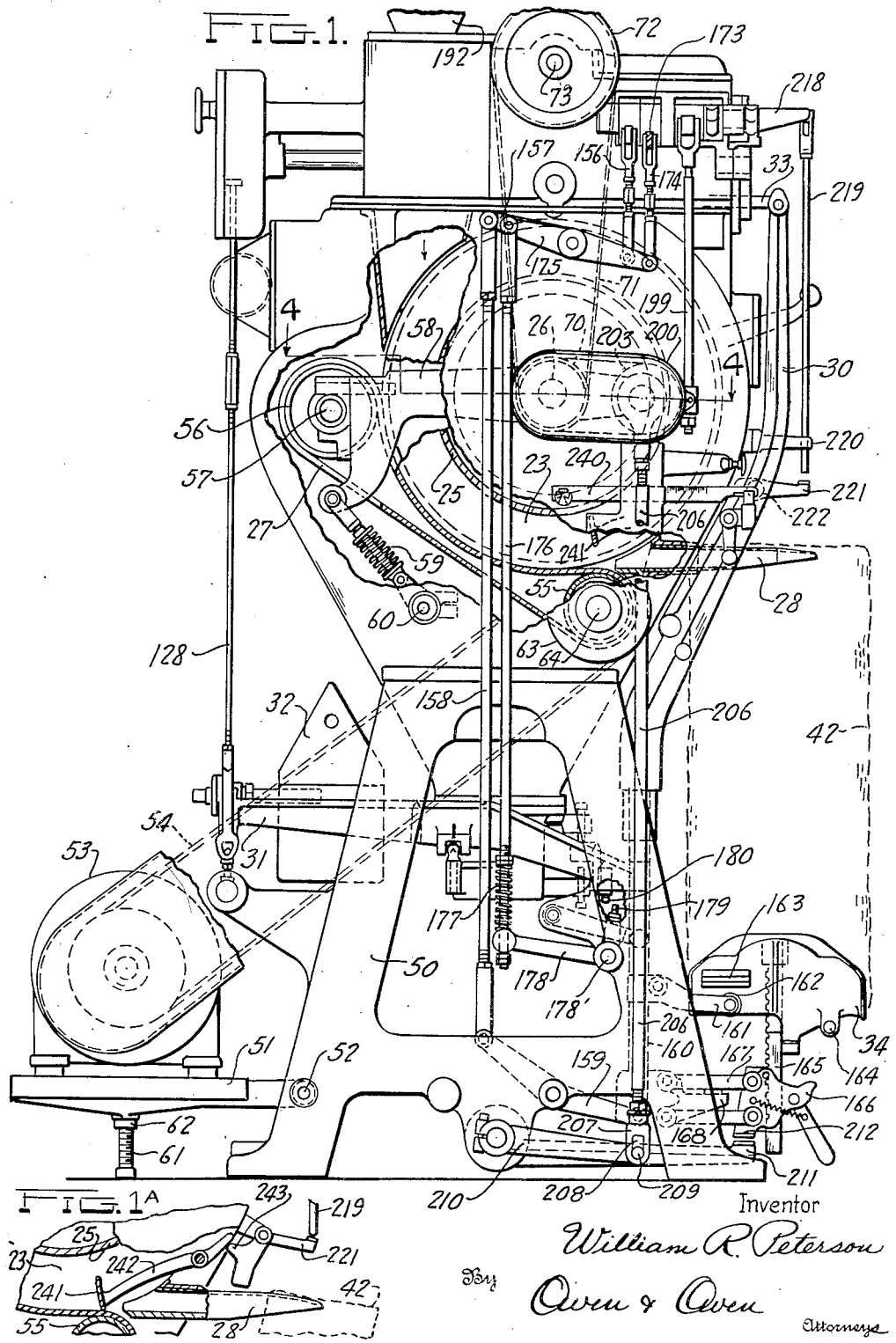

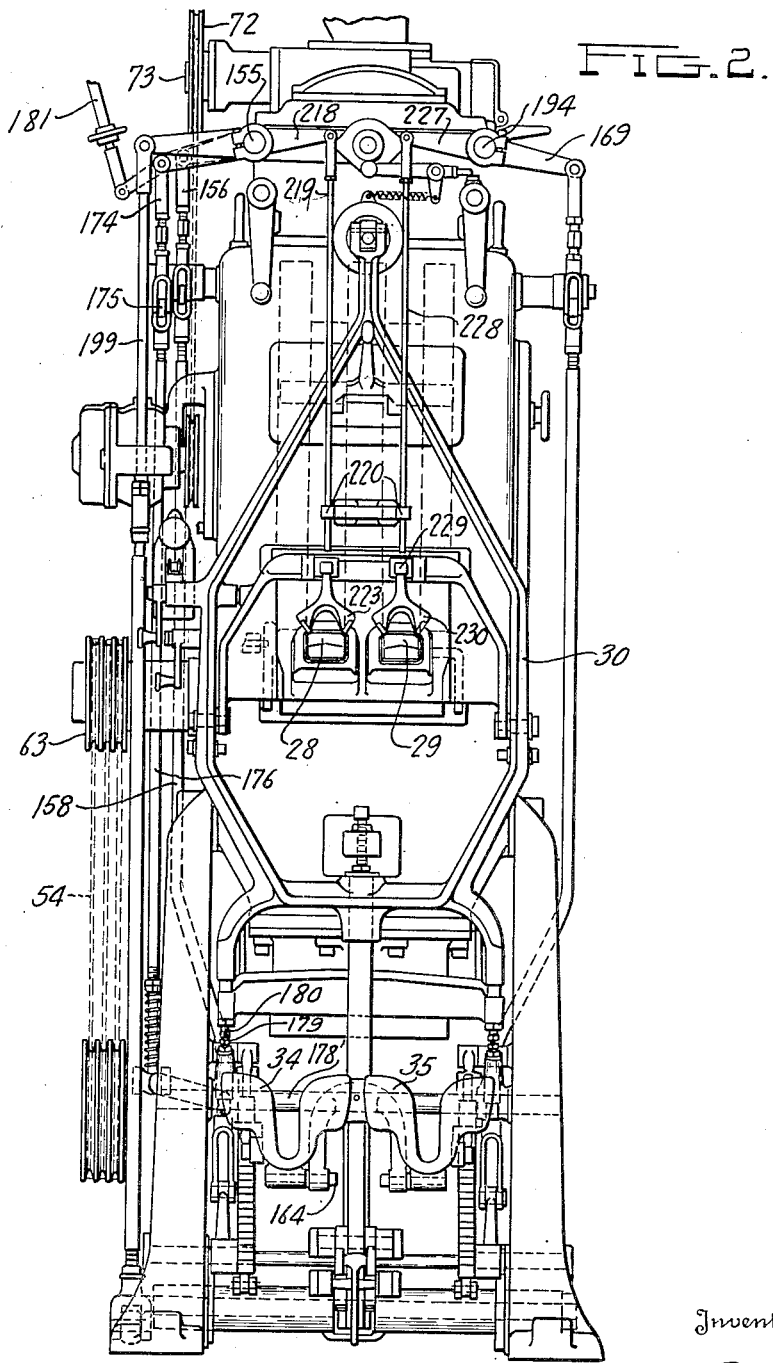

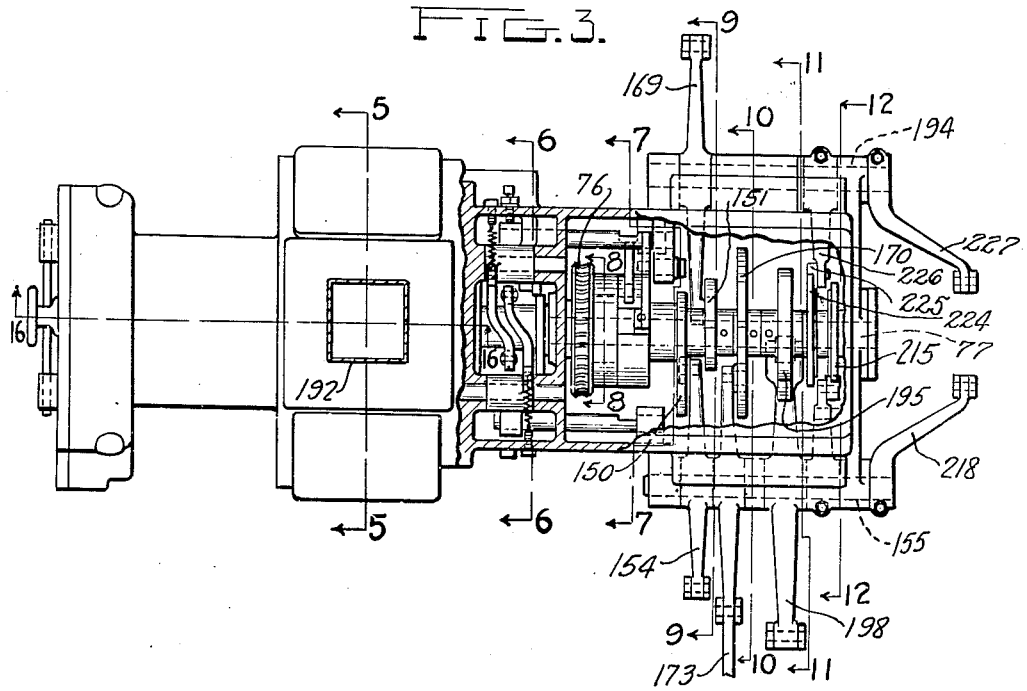
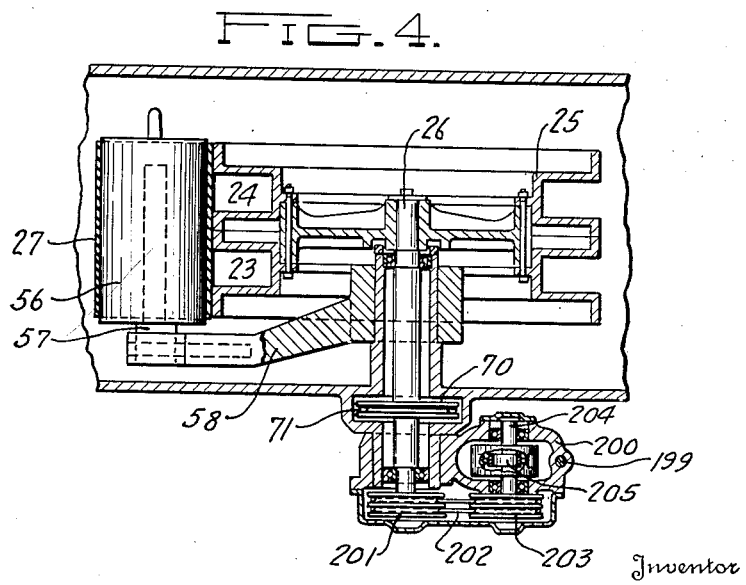

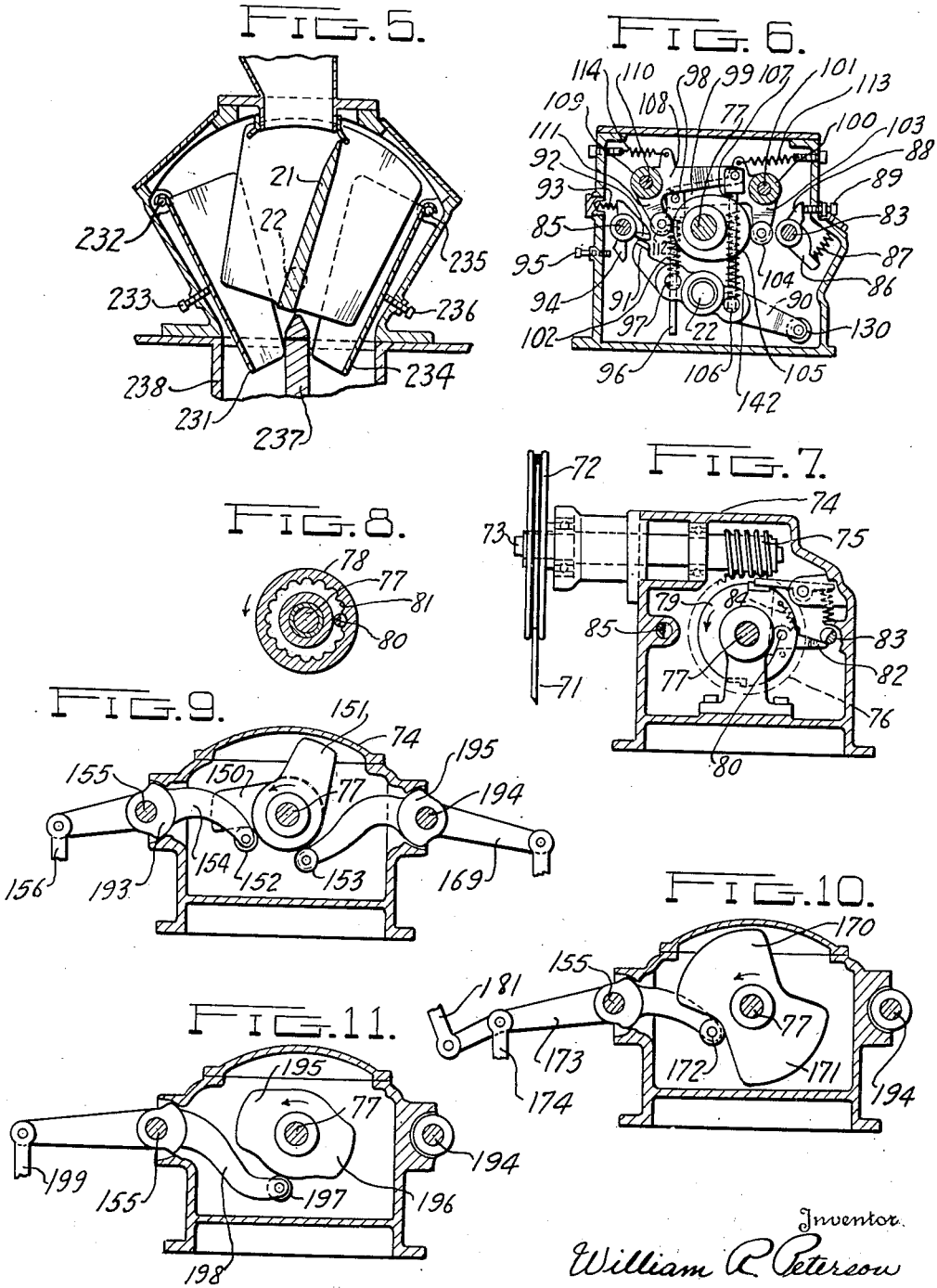

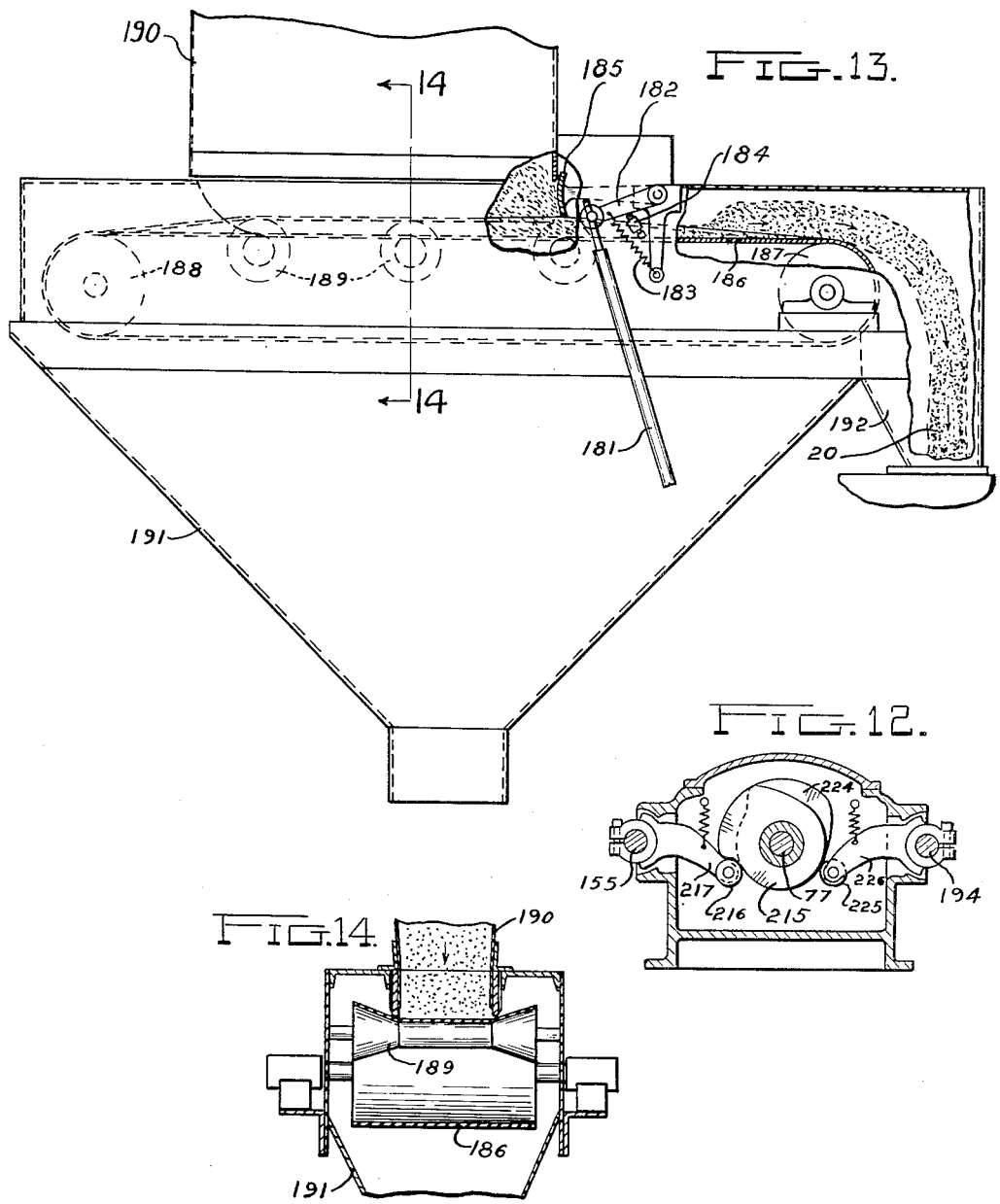

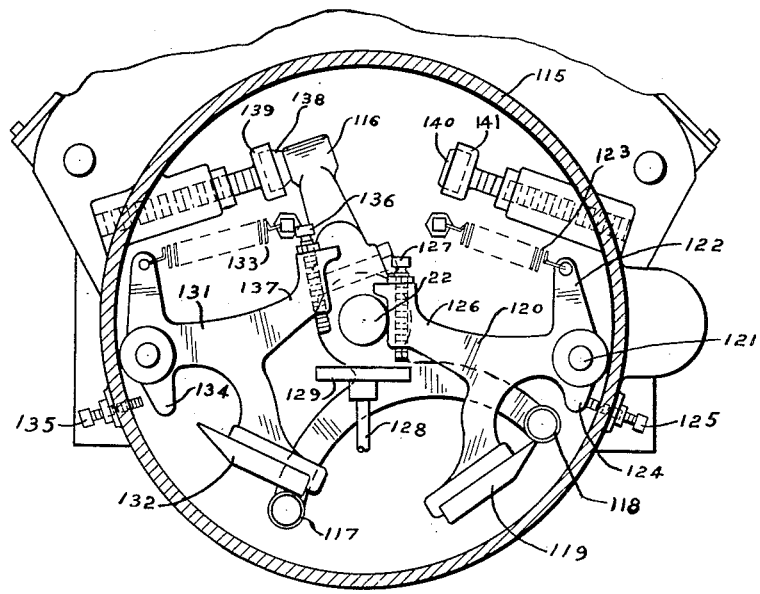
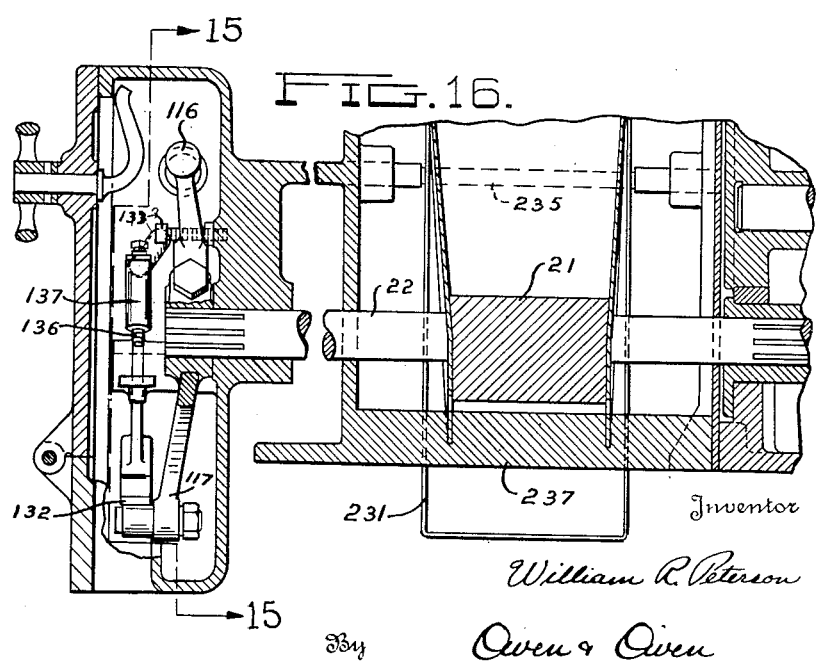

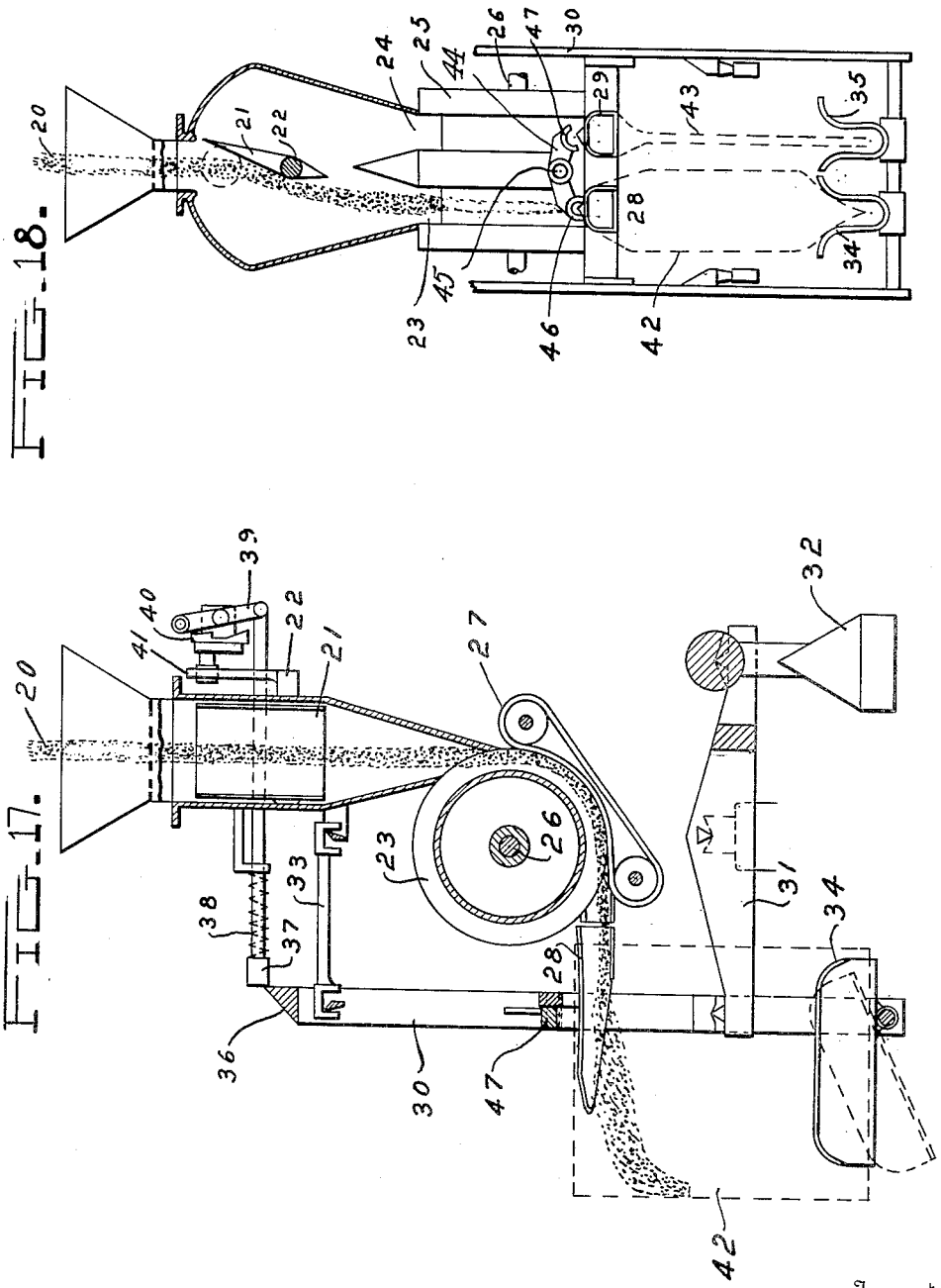

2,345,287

UNITED STATES PATENT OFFICE 2,345,287

FILLING VALVE BAGS

William Roy Peterson, Oswego, N. Y., assignor to St. Regis Paper Company, New York, N. Y., a corporation of New York Application March 9, 1939, Serial No. 260,736

17 Claims. (Cl. 249—60)

This invention relates to filling valve bags, and has for its object to provide an apparatus whereby a stream of material may be supplied continuously, but preferably in automatically regulated varying amounts, and delivered alternately to a pair of bag filling mechanisms mounted upon a common weighing means.

Further objects of the invention are to provide means by which the scale beam is locked during the major portion of the filling operation and the bottom of the bag is jigged during this operation, and which then automatically releases the weighing device.

Another object of the invention is to provide means by which the weighing device effects the automatic switching of the stream from one delivery device to the other.

Another object of the invention is to provide apparatus, the operation of which is initiated by the switching of the stream, to effect the automatic operation of the scale lock, the jigging device and, if desired, of bag clamping and discharging means.

Minor details and objects of the invention will appear as the description proceeds.

In the accompanying drawings forming a part of this specification,

Figure 1 is a side elevation of one embodiment of the invention, with parts broken away;

Fig. 1a is a diagrammatic detail view showing the operation of the bag clamp and shut off gate;

Fig. 2 is a front elevation of the apparatus shown in Fig. 1;

Fig. 3 is a plan view of the top portion of Fig. 1, parts being broken away;

Fig. 4 is a detail section approximately on the line 4—4 of Fig. 1;

Figs. 5 to 12, inclusive, are detail sections on the respective lines 5—5 to 12—12, inclusive, on Fig. 3;

Fig. 13 is a side elevation of apparatus for supplying material to the apparatus shown in Fig. 1, parts being broken away for purposes of illustration;

Fig. 14 is a detail section on the line 14—14 of Fig. 13;

Fig. 15 is a section approximately on the line 15—15 of Fig. 16;

Fig. 16 is a section approximately on the line 16—16 of Fig. 3;

Fig. 17 is a largely diagrammatic side view of the apparatus, and

Fig. 18 is a similar front view of the apparatus, these views illustrating the general operation of the machine.

The general operation of the machine will be described first in connection with Figs. 17 and 18. In these figures, there is indicated a continuously supplied stream of material 20 which is alternately deflected by a deflector 21 mounted on a pivot shaft 22 so that the stream alternately passes into delivery channels 23 and 24 in a grooved wheel 25 mounted upon a shaft 26. A belt 27 contacts a portion of the periphery of pulley 25 and carries the stream around the pulley from the vertical direction in which it is received to a horizontal discharge direction. The stream is delivered alternately to filling spouts 28 and 29 mounted upon a carrier 30. The carrier 30 is pivotally mounted upon a forked scale beam 31 counterbalanced by a weight 32. The upper part of frame 30 is held upright by a link 33 parallel with the forward end of scale beam 31. Bottom supports 34 and 35 are mounted beneath the respective filling spouts 28 and 29. The upper end of frame 30 is provided with a suitable member 36 which normally stops the forward movement of a rod 37, urged forward by a spring 38. The rear end of rod 37 is connected to a lever 39 operated by a cam and clutch device 40 which also operates an arm 41 on shaft 22.

As indicated by dotted lines, a valve bag 42 may be placed upon the spout 28 in position to receive stream 20, and an empty bag 43 may be placed upon spout 29 in position to receive the stream after deflector 21 is moved. A clamp carrier 44 is indicated as being pivoted at 45 on frame 30 and carries clamping members 46 and 47 which are alternately pressed downward to clamp a bag upon spout 28 or 29, respectively.

After the bag 42 is filled sufficiently so as to overcome counterbalance 32, rod 37 is propelled over the lowered stop 36, and mechanism 40 is operated in a way, which is not shown in detail, to actuate arm 41, shaft 22 and deflector 21 so as to divert the stream 20 to channel 24 and bag 43. At the same time by means of connections, not shown, clamping member 44 is oscillated so as to clamp bag 43 on spout 29 and release bag 42 from spout 28. Also, bottom support 34 is tilted to the position in which it is shown in dotted lines on Fig. 17 so as to discharge the bag. After the bag is discharged, the bottom support 34 is returned to its normal position and an empty bag is placed upon spout 28. When the bag 43 is filled, a reverse switch of the stream takes place, it being understood that mechanism 40 is operative after the switching operation to withdraw rod 37, allowing abutment 36 to rise after the filled bag is discharged so that the apparatus is in condition to be operated again when bag 43 is filled.

The broad outlines of the operation having been described in connection with the diagrammatic figures, the details of the mechanism will be described in connection with Figs. 1 to 16, showing the mechanism more completely. In some particulars, the mechanism indicated in the diagrammatic figures has been modified for purposes of illustration so that the details of the several parts do not agree in all particulars with the diagrammatic views.

The apparatus is mounted upon a support designated generally by reference number 50. A bracket 51 is pivoted at 52 upon one foot of the frame 50 and carries a motor 53. Motor 53, through suitable connections, drives a belt 54 which in turn drives a pulley 63 on a shaft 64. Shaft 64 carries a pulley 55 which drives belt 27. The other end of belt 27 passes around a pulley 56 mounted upon a shaft 57 in a bracket 58 pivoted on shaft 26. A spring 59 normally oscillates bracket 58 upward about shaft 26 and pulley 25 so as to maintain belt 27 in firm contact with pulley 25. As indicated, spring 59 is mounted upon telescoping means pivoted at one end to bracket 58 and pivoted at the other end at 60 upon a portion of frame 50.

In the construction shown, belt 54 may be maintained tight by means of screw 61 held in adjusted position by nut 62 and which determines the elevation of bracket 51.

One end of shaft 26 carries a pulley 70, as indicated on Fig. 1, which is connected by a suitable belt 71 with a pulley 72 upon a shaft 73 mounted in a housing 74. Inside of the housing, shaft 73 carries a worm 75 meshing with a worm-wheel 76 which rotates freely upon cam shaft 77, except when united therewith by means of a clutch.

The wheel 76 carries a sleeve 78, as indicatd in Fig. 8, which forms one part of a clutch member. A disc 79, as indicated on Fig. 7, is fixed upon shaft 77 and carries a pin 80 which is in the position indicated in Fig. 8 when the clutch is opened and is oscillated to engage a groove 81 in sleeve 78 when the clutch is to be closed. Pin 80 extends through disc 79 and has fixed thereon an arm 82 which normally engages an oscillatable pin 83 which is cut away, as indicated on Fig. 7, so as to allow the end of arm 82 to pass when pin 83 is oscillated. A spring 84 constantly urges arm 82 and pin 80 towards clutch-closing direction.

The clutch is operated 180° at a time, there being a pin 85 on the opposite side of the housing from pin 83 and adapted to engage finger 82 and open the clutch after it has moved through 180°. Pin 85 likewise is cut away on one side, as shown in Fig. 7, so that when it is oscillated, it may intercept finger 82, but in the position shown would allow the finger to pass.

Pins 83 and 85 are controlled as follows: Pin 83 has mounted thereon an arm 86 normally spring-pressed in clockwise direction by a spring 87, as shown in Fig. 6. Pin 83 likewise carries an arm 88 which engages an adjustable abutment 89 to limit the oscillation of the pin in response to spring 87. Shaft 22, which carries the deflector element 21, extends forward into housing 74 and has mounted thereon a lever 90. In the position in which it is shown in Fig. 6, the right end of lever 90 is depressed and the left end, which carries abutment 91, is in contact with an arm 92 upon pin 95, and oscillates the pin in a direction to compress spring 93 and move arm 94 of the pin away from the adjustable abutment screw 95. This holds pin 85 in the position in which it is shown in Fig. 7 so that it would not contact finger 82.

A rod 96 has a slide connection with a pivot 97 in the left arm of lever 90, and is pivoted at its upper end at 98 to an arm 99 of a bell crank lever 100 pivoted at 101 in the housing. A spring 102 is compressed between arm 99 and lever 90 in the position in which the apparatus is shown in Fig. 6. Another arm 103 of bell crank lever 100 carries at its end a cam roller 104 which engages a cam 105 upon a cam shaft 77, and in the position in which the parts are shown in Fig. 6, it prevents the upward movement of arm 99 and, therefore, tends to force downward the left arm of lever 90.

The right arm of lever 90 similarly is provided with a pivotal connection 106 through which there slides a pin 107 pivoted upon one arm 108 of a bell crank lever 109, which is fulcrumed upon a shaft 110 mounted in the housing. Bell crank lever 109 also carries an arm 111 provided with a cam roller 112 engaging the other side of cam 105. Cam rollers 104 and 112 are maintained in engagement with cam 105 by means of springs 113 and 114, respectively.

The shaft 22 extends on the other side of the deflector from the clutch mechanism last described to a tripping arrangement which is constructed as follows:

Upon the rear end of shaft 22 there is mounted, in a housing 115, a lever having three arms 116, 117, and 118. In the position in which the apparatus is shown in Fig. 15, the lever and shaft 22 are held in position by the contact of arm 118 with a stop member 119 mounted upon a lever 120 journaled at 121. Lever 120 also carries an arm 122 subjected to the action of tension spring 123 which tends to hold the lever in the position in which it is shown in that figure and with abutment arm 124 in contact with an adjustable stop screw 125.

Lever 120 is also provided with an arm 126 carrying an adjustable stop screw 127. A rod 128, which is actuated by the weighing mechanism in a manner to be described later, carries at its upper end a cross piece 129, and when rod 128 is raised, the cross piece 129 contacts screw 127 and moves member 119 out of the path of the end of arm 118. This allows compressed spring 102 to oscillate lever 90, and shaft 22, carrying deflector 21 to the opposite position from that in which it is shown in Fig. 5. This same movement of lever 90 moves end 91 away from arm 92 and allows spring 93 to oscillate pin 85 to bring arm 94 in contact with stop member 95. In this position, the pin 85 is oscillated so that it is turned into the path of finger 82. At the same time, roller 130 on the other end of lever 90 contacts arm 86 and turns pin 83 so that it allows finger 82 to pass the cut out portion of the pin, thereby oscillating pin 80 and bringing it into engagement with a notch 81 and causing the rotation of shaft 77 through 180° until the finger contacts pin 85.

Pivoted in housing 115 at the opposite side from lever 120 there is a similar lever 131 carrying an arm 132 similar to arm 119. It will be seen that in the position in which the parts are shown in Fig. 15, the end of arm 117 prevents movement of the lever 131 in response to the spring 133, which is similar to spring 123, but when shaft 22 is oscillated in the manner just described, the end 117 moves past the beveled portion of member 132 and allows the oscillation of lever 131 until projection 134 contacts adjustable stop pin 135. This action is permitted when the filled bag has been discharged so that the scale beam is returned to its original position and cross piece 129 is lowered, thereby allowing the lowering of adjustable stop pin 136 in arm 137 to a position similar to that shown for pin 127 in Fig. 15. In the meantime, the end of arm 118 has moved along member 119 so as to hold it in a position similar to that in which member 132 is shown in Fig. 15.

Arm 116 in the position in which it is shown in Fig. 15 is in contact with a resilient buffer pad 138 mounted in an adjustable holder 139. When the shaft 22 is oscillated in the manner described, the oscillation is terminated by the striking of arm 116 against resilient pad 140 mounted in an adjustable holder 141.

It will be readily understood that, upon the next filling operation when rod 128 is again raised, lever 131 will be oscillated so as to allow the return of shaft 22 to the position in which it is shown in Fig. 15, this being effected by spring 142 on pin 107 which has been compressed by the movement of cam 105 through 180° in response to the operation of the clutch as described, the cam then contacting roller 112 and thereby oscillating lever 108. At the same time, roller 104 was allowed to move inward toward shaft 77 in response to spring 113 so that spring 102 did not resist this oscillation of shaft 22. It will be seen that the second described oscillation of shaft 22 which returns the parts to the position in which they are shown in Fig. 6 will again release the finger 82 from pin 85 and at the same time turn pin 83 so that it will stop finger 82 after another half revolution of the cam 105. The cycle is thus completed and the parts are once more in the position in which they are shown in the drawings.

It will be readily seen from the foregoing that, upon each operation of the scale beam and the consequent rise of rod 128, the deflector 21 is oscillated to switch the stream, and at the same time the half revolution clutch is closed so that cam shaft 77 is automatically turned through 180° after the filling of each bag. The other operations which result from these movements of cam shaft 77 will be described next, the cam arrangements being shown in Figs. 9 to 12, inclusive. The operations effected by the respective cams will be described in succession in the order in which the figures are numbered, although the actual operations of the mechanism do not occur in that order.

In Fig. 9, there are shown mounted on shaft 77 two cams 150 and 151 which operate respectively upon cam rollers 152 and 153. Cam roller 152 is mounted on the end of a lever 154 pivoted upon shaft 155 in housing 74. The outer end of the lever is connected by a link 156 to another lever 157, as shown in Fig. 1. The other end of lever 157 is connected by a link 158 with a lever 159 near the base of the machine. Lever 159 is connected to a slide 160, indicated in dotted lines on Fig. 1, which carries a bracket 161. A roller 162 in the outer end of bracket 161 contacts a lug 163 upon the bottom support 34, which is indicated as being pivoted at 164 upon a support 165. The support 165 is vertically adjustable in a latch device 166 carried by the outer ends of parallel links 167 mounted upon the frame 30. The links 167 are prevented from falling below a predetermined point by a lug 168.

It will be seen that when shaft 77 is rotated from the position in which it is shown in Fig. 9, the cam 150 operates through the intermediate connections to immediately raise roller 162 and tilt the bag support to discharge the bag. At the end of 180° movement of shaft 77, cam 151 is just ready to operate cam roller 153 on lever 169, and upon the next movement of shaft 77, lever 169 is operated in the same manner as previously described in connection with lever 154, and by similar connections is operable to tilt bag support 35.

In Fig. 10, there is disclosed upon shaft 77 cam extensions 170 and 171 which operate alternately upon a cam roller 172 on a lever 173, so that this lever is operated each time the shaft 77 is moved through 180°.

Lever 173 is connected by a downwardly extended link 174 to a lever 175, as clearly shown on Fig. 1. The other end of lever 175 is connected by a link 176 through a yielding connection 177 to an arm 178 on a rock shaft 178'. Shaft 178' carries arms having thereon adjustable stop screws 179 which are inserted by the rocking of the shaft beneath adjustable stop screws 180 on the weighing beam. It will be readily seen that if cam 170 forces rod 176 downward before the bag is discharged and while the front end of the weighing beam is depressed, screw 179 may encounter screw 180, but spring 177 will yield and, immediately upon the discharge of the bag and the consequent rise of the front end of the scale beam, screw 179 is forced by spring 177 beneath screw 180. Because of this yielding connection, a slight variation in timing between the operation of the bag discharge and the scale locking device does not interfere with the correct operation of locking the load end of the scale beam in its upward position by the insertion of screw 179 under screw 180.

Lever 173 is extended beyond its connection to link 174 and is connected by a link 181 with a stream control device shown in Figs. 2 and 13. The control device comprises an arm 182 connected to link 181 and normally held in the position in which it is shown in Fig. 13 by a spring 183 which draws it downward against an adjustable stop screw 184. Mounted to move with arm 182 there is a gate 185 which is moved by the operation of arm 181 towards and from a material conveying belt 186. Belt 186 passes over drums 187 and 188 at the ends thereof, and is driven by any suitable means, not shown. The upper run of belt 186 is supported by a series of rollers 189 having flared conical ends, whereby the edges of the belt are elevated above the middle thereof, as shown in Fig. 14. The belt passes in this shape beneath a supply hopper 190 for the material, and as great a depth of material is carried forward by the belt as permitted by gate 185. In the position shown in Fig. 13, the gate has been in the lowered position for a short time and is just ready to be raised to allow a larger discharge.

In the construction shown, a housing 191 is provided to carry off any dust or leakage from the belt device described, and at the discharge end of the belt there is a guide 192 which directs stream 29 downward towards deflector 21. It will be noted on Fig. 9 that a segmental member 193 is mounted on shaft 155 so as to rock in a suitable socket in the side of housing 74 and keep dust out of that housing. Lever 169 is pivoted upon a shaft 194 similar to shaft 155, and this lever also is provided with a segment 195 which makes a substantially dust-tight joint with housing 74. The other levers operated by the cams within the housing and mounted upon shafts 155 and 194 are similarly provided with dust-excluding segments.

Shaft 77 also carries opposed cam members 195 and 196, as shown in Fig. 11. These cam surfaces operate alternately during successive movements of shaft 77 upon a cam roller 197 mounted in the end of a lever 198. The other end of the lever 198 is connected by a link 199 to the end of a housing member 200 which is mounted to oscillate about the extended end of shaft 26, as shown in Figs. 1 and 4. On the end of shaft 26 within housing 200 there is a pulley 201 which drives belt 202 passing around a pulley 203 on a shaft 204 in the free end of the housing. On shaft 204 there is an eccentric 205 connected to a rod 206. At the lower end of rod 206 there is a coupling member 207 having therein a slot 208 through which there projects a pin 209 upon a lever 210. The forward end of lever 210 carries an abutment plate 211 which contacts plate 212 on member 166 when the outer end of housing 200 is raised. When lever 198 is rocked to raise the free end of housing 200, plates 211 and 212 are in contact, and thereby the bottom support for the bag is given a rapid jigging motion by the rotation of eccentric 205, but when the housing 200 is lowered, plate 211 is lowered so that the bottom of the bag is no longer supported and jigged thereby.

At its right hand end, as viewed in Fig. 3, shaft 77 carries a cam 215, clearly shown in Fig. 12, which operates a cam roller 216 on the end of a rock arm 217 on shaft 155. The forward end of shaft 155 carries a rock arm 218 which is connected to a rod 219 sliding vertically in a guide 220, as shown in Figs. 1, 2 and 3. When shaft 155 is rocked to lower rod 219, it strikes the outer end of a bell crank lever 221 pivoted at 222 upon support 30, and carrying at its other end a clamping member 223, in place of the clamping member 46 indicated diagrammatically on Fig. 18.

Shaft 77 also carries a cam 224 operating a cam roller 225 on the end of arm 226 upon rockshaft 194. The forward end of shaft 194 carries an arm 227 from which depends a rod 228 adapted to contact the end 229 of a bell crank lever similar to lever 221, and operating in a similar manner clamp 230 corresponding to the clamping member 47, diagrammatically indicated on Fig. 18.

As shown in Fig. 5, there may be provided an adjustable plate 231 hung on rod 232 and adjusted by a screw 233, and a similar plate 234 hung on rod 235 and adjusted by screw 236. These plates are employed to assist in guiding the stream 20 as it is deflected by deflector 21 alternately to the two channels on opposite sides of guide 237 and within the chute 238 which directs the stream alternately to the two grooves 23 and 24 in grooved wheel 25.

Supplemental scale beam 240 is pivoted at its rear end on the stationary frame and at its front end upon the carrier 30, and is parallel with the load end of beam 31. A weight for fine adjustment is mounted upon beam 240. Weight 32 is not as easily accessible as the supplemental weight on beam 240, but adjustment of this readily accessible weight, at the side of the apparatus and at about the height of the discharge spout on which the operative places the empty bags, affords all the adjustment ordinarily required during a run for filling bags with a given predetermined weight of material.

As shown in Figs. 1 and 1a, there is a gate 241 operating in groove 23. The gate is mounted upon a lever 242, the other end of which is in the path of an abutment 243 on clamp lever 221, so that the movement of lever 221 to release clamp 223 forces gate 241 downward, as shown in Fig. 1a.

The gate may be held upward by a spring, not shown, or the pressure of material against its slanting face may operate to raise it, in which latter case the gate smooths the top of the discharged stream and makes it conform to the upper side of the spout.

Ordinarily, the material between deflector 21 and the spout at the time the deflector is oscillated to cut off the supply of material to spout 28, is all discharged into the bag before the clamp is released and the bag removed. However, small amounts of material may lodge temporarily at some point in the path between the deflector and spout, and may be dislodged after the bag is removed. Such belated discharge is always objectionable and might be dangerous to the operative. Gate 241 prevents any such belated discharge.

A similar gate, not shown, is provided for groove 24 and spout 29.

It will be noted in connection with the disclosure of the mechanism that there are means for adjustment in many of the links and connections which have not been mentioned in detail and which may be obviously employed or not in the locations where they are disclosed or in other desirable locations about the apparatus in order to make the device adjustable for employment with different materials and rates of filling, and for proper relative adjustment of the timing of the different operations. The timing of the cam shaft 77 in relation to the shaft 26 ordinarily does not need to be changed for a given kind of material, but where desired, different sized pulleys at 70 and 72 may be employed, or change speed mechanism may be employed, if the character of the material or the size of the bags to be filled are varied sufficiently to justify such mechanism.

The operation of the device will be fairly clear from the foregoing detailed description of the operative parts, the operation of the several cams having been discussed to some extent while describing their connections. However, for convenience, a complete cycle of the machine may be briefly reviewed.

With the parts in the positions in which they are shown in the drawings, it will be noted that bag 42 is being filled and that rockshaft 178' is rocked to unlock the weighing device. Simultaneously with the lock release by movement of lever 173, the gate 185 has been lowered so that a comparatively thin stream is fed forward by belt 186. The apparatus is preferably timed so that the rotation of shaft 77 ceases and the parts assume the position in which they are shown in the drawings only a second or two before the completion of the filling of the bag, early enough so that the completion of the filling will take place by the stream which is reduced in thickness by the lowering of gate 185.

When the forward end of the scale beam is lowered and the rear end raised in response to the completion of the predetermined weight within bag 42, the rod 128 is raised so as to encounter screw 127 to start cam shaft 77 through the mechanism which has been described in detail and which is shown in Figs. 15, 6, 7 and 8. There-upon, the rotation of the cam shaft 77 causes the release of clamp 223 by the cam indicated in Fig. 12 and almost simultaneously the cam shown in Fig. 9 results in the raising of roller 162, the tilting of the bottom support 34, and the discharge of the bag. Upon this happening, the front end of the scale beam rises and rockshaft 178' is rocked to lock the scale in the upper position. Gate 185 is raised to allow a full stream to be discharged into bag 43 by the movement of lever 173 immediately upon the starting of shaft 77, the yielding connection 177 allowing this to take place prior to the completion of the bag discharge. The deflector 21 is oscillated immediately upon the upward movement of screw 127 by the oscillation of shaft 22 which starts shaft 77. Cam 195 is then operative to raise the free end of housing 200 and render the jigging device effective. This jigging device is maintained in effective position while the major portion of the desired charge is being placed in the bag. The relation of pulleys 70 and 72 are such that the half revolution of cam shaft 77 is completed a second or so before the filling of the bag is completed, as indicated above. Before the completion of the rotation of the cam shaft, the free end of housing 200 is allowed to drop, thereby stopping the jigging device, and rod 176 is raised, thereby freeing the end of the scale beam for lowering movement. The device is then in position for the completion of the charge in bag 43 by comparatively slow feed of material thereto as previously described in connection with bag 42. When the predetermined weight of material has been received by bag 43, rod 128 is again raised, contacting screw 136 and causing the oscillation of deflector 21 back to its original position, and starting of the cam shaft 77 upon the second half of its revolution, during which the same movements occur as described above, but in connection with bag 43 instead of bag 42.

After the discharge of bag 42 and before the completion of filling bag 43, the attendant will place an empty bag upon spout 28. Clamp 223 is mounted so that it yields readily for the placing of a bag upon spout 28, but automatically clamps the bag against removal until freed by rod 219.

While an arrangement like that shown in Fig. 13 is desirable for accurate weights where such are necessary, it will be readily understood that, especially with free flowing materials, this arrangement is not always necessary, and while it may be combined with the other operating features of the mechanism to advantage, the apparatus might be used without this feeding device or with any appropriate source of continuous stream whether or not modified so as to give greater charges during the jigging period than during the weighing period.

While the fully automatic operation described above is desirable and the parts are preferably timed to operate in the desired relation to each other, it will be readily understood that, for purposes of simplification, some of the features might be omitted at times without destroying the usefulness of other features which have been described.

What I claim is:

1. Apparatus for filling bags comprising a scale beam, a support for a bag mounted upon the load end of the scale beam, means for filling material into the bag while on the support, means operated by the action of the beam to shut off the feed of material, a lock for locking the load end of the scale beam against descent, automatic means controlled in timed relation with the material delivery means to release the lock prior to the completion of the filling of the bag, means to discharge the filled bag from the support after the delivery of material thereto has been shut off, and a yielding connection urging the lock towards locking position, whereby the lock is spring pressed to locking position immediately upon the rise of the load end of the beam after discharge of the filled bag.

2. Apparatus for filling valve bags comprising a scale beam, a support for a valve bag connected by parallel links to the load end of the beam, means for filling the bag while on said support, a stop limiting the drop of the links with respect to the beam, a jigger oscillating the links while the bag is being filled, and automatic means controlling the jigger and the filling of material into the bag and stopping the jigging action and thereafter reducing the rate of feed of material into the bag before the filling of the bag is completed.

3. Apparatus for filling valve bags comprising a scale beam, a support for a valve bag connected by parallel links to the load end of the scale beam, means for filling material into the bag while on the support, a lock for preventing the downward movement of the load end of the scale beam, a stop limiting the drop of the links with respect to the beam, a jigger oscillating the links, and automatic timing means controlling the jigger, lock, and material delivering means, and regulating the delivery means to deliver a relatively large stream to the bag during the major filling operation and to maintain the lock in position and the jigger in operation during the main portion of the filling operation and stopping the jigger, releasing the lock and reducing the volume of the stream of material before the bag is completely filled.

4. Apparatus for filling valve bags comprising a scale beam, two spouts mounted upon the scale beam and each adapted to enter the valve of a bag, means for providing a continuous stream of material, separate propelling means for propelling material into the two spouts, means for deflecting the stream alternately to the two propelling means, connections from the weighing beam controlling the movement of the deflector, a cam shaft, continuously driven means operating the propeller, a 180° clutch operative when closed to connect said continuously operating means to the cam shaft, the connections of the cam shaft to the continuously operating means and to the propeller being proportioned so that a movement of the cam shaft through 180° occupies the major portion of the time required to fill the desired charge into a bag, and connections from the cam shaft controlling various operations of the bag filling apparatus.

5. Apparatus for filling valve bags comprising a scale beam, two spouts mounted upon the scale beam and each adapted to enter the valve of a bag, means for providing a continuous stream of material, separate propelling means for propelling material into the two spouts, means for deflecting the stream alternately to the two propelling means, connections from the weighing beam controlling the movement of the deflector, a cam shaft, continuously driven means operating the propeller, a 180° clutch operative when closed to connect said continuously operating means to the cam shaft, the connections of the cam shaft to the continuously operating means and to the propeller being proportioned so that a movement of the cam shaft through 180° occupies the major portion of the time required to fill the desired charge into a bag, and connections from the cam shaft locking the scale beam against descent during the major portion of the time while the shaft is turning.

6. Apparatus for filling valve bags comprising a scale beam, two spouts mounted upon the scale beam and each adapted to enter the valve of a bag, means for providing a continuous stream of material, separate propelling means for propelling material into the two spouts, means for deflecting the stream alternately to the two propelling means, connections from the weighing beam controlling the movement of the deflector, a cam shaft, continuously driven means operating the propeller, a 180° clutch operative when closed to connect said continuously operating means to the cam shaft, the connections of the cam shaft to the continuously operating means and to the propeller being proportioned so that a movement of the cam shaft through 180° occupies the major portion of the time required to fill the desired charge into a bag, a jigger, and connections from the cam shaft starting the operation of the jigger shortly after the cam shaft starts to turn and stopping the operation of the jigger shortly before the cam shaft ceases to turn.

7. Apparatus for filling valve bags comprising a scale beam, two spouts mounted upon the scale beam and each adapted to enter the valve of a bag, means for providing a continuous stream of material, separate propelling means for propelling material into the two spouts, means for deflecting the stream alternately to the two propelling means, connections from the weighing beam controlling the movement of the deflector, a cam shaft, continuously driven means operating the propeller, a 180° clutch operative when closed to connect said continuously operating means to the cam shaft, the connections of the cam shaft to the continuously operating means and to the propeller being proportioned so that a movement of the cam shaft through 180° occupies the major portion of the time required to fill the desired charge into a bag, and connections from the cam shaft controlling the volume of the continuous stream and increasing the volume substantially at the beginning of the turning of the cam shaft and reducing the volume of the stream substantially at the close of the turning of the cam shaft.

8. Apparatus for filling valve bags comprising a scale beam, two spouts mounted upon the scale beam and each adapted to enter the valve of a bag, means for providing a continuous stream of material, separate propelling means for propelling material into the two spouts, means for deflecting the stream alternately to the two propelling means, connections from the weighing beam controlling the movement of the deflector, a cam shaft, continuously driven means operating the propeller, a 180° clutch operative when closed to connect said continuously operating means to the cam shaft, the connections of the cam shaft to the continuously operating means and to the propeller being proportioned so that a movement of the cam shaft through 180° occupies the major portion of the time required to fill the desired charge into a bag, and connections from the cam shaft discharging a filled bag from the spout from which the material has been deflected promptly after the starting of the cam shaft.

9. Apparatus for filling valve bags comprising a scale beam, two spouts mounted upon the scale beam and each adapted to enter the valve of a bag, means for providing a continuous stream of material, separate propelling means for propelling material into the two spouts, means for deflecting the stream alternately to the two propelling means, connections from the weighing beam controlling the movement of the deflector, a cam shaft, continuously driven means operating the propeller, a 180° clutch operative when closed to connect said continuously operating means to the cam shaft, the connections of the cam shaft to the continuously operating means and to the propeller being proportioned so that a movement of the cam shaft through 180° occupies the major portion of the time required to fill the desired charge into a bag, a clamp for clamping the bag upon the spout, a tiltable bottom support for a bag upon each spout, and connections from the cam shaft for releasing the clamp associated with the spout from which the material has just been diverted and tilting the associated bottom support immediately after the movement of the cam shaft is started.

10. Apparatus for filling valve bags comprising a scale beam, two spouts mounted upon the scale beam and each adapted to enter the valve of a bag, means for providing a continuous stream of material, separate propelling means for propelling material into the two spouts, means for deflecting the stream alternately to the two propelling means, connections from the weighing beam controlling the movement of the deflector, a cam shaft, continuously driven means operating the propeller, a 180° clutch operative when closed to connect said continuously operating means to the cam shaft, the connections of the cam shaft to the continuously operating means and to the propeller being proportioned so that a movement of the cam shaft through 180° occupies the major portion of the time required to fill the desired charge into a bag, a clamp for clamping a bag upon each spout, a pivoted bottom support for the bottom of a bag upon each spout, a jigging device operative to impart vertical jigging motion to the bottom support, a lock for preventing downward movement of the scale beam, and means for varying the volume of the constant stream of material, and connections from the cam shaft operative upon the starting of the cam shaft to release the clamp from the spout from which the stream of material has just been diverted and tilt the bottom support to discharge the bag, to render the lock operative immediately upon the rise of the beam when relieved of the weight of the filled bag, to render operative the jigging device upon the bottom support associated with the other spout, to increase the volume of the stream being delivered to the propeller, all during the first portion of the movement of the cam shaft, and during the latter part of the movement of the cam shaft to render the jigging operation inoperative, release the lock, and reduce the volume of the stream being delivered to the propeller.

11. In apparatus for filling bags, a scale beam, a bag support connected to the load end of the beam by substantially horizontal parallel links, means limiting the downward movement of the links with respect to the beam, a stop movable into position to limit the downward movement of the load end of the beam, a jigging device operable to oscillate the links, and means to render the jigger operative while the stop is operative and to render the jigger inoperative while the stop is inoperative.

12. In bag filling apparatus, a scale beam, two spouts mounted upon the scale beam and each adapted to enter the valve of a bag, constantly rotating propeller means having a part adapted to drive material to and through each spout, means for supplying a continuous stream of material switchable from the propeller part adapted to drive the material to one spout to the propeller part adapted to drive material to the other spout, a lock for the scale beam, means to release said lock when the propeller has made a predetermined number of revolutions after the switch of the stream, and means actuated by the beam for switching the stream after the lock has been released.

13. In bag filling apparatus, a scale beam, two spouts mounted upon the scale beam and each adapted to enter the valve of a bag, constantly rotating propeller means having a part adapted to drive material to and through each spout, means for supplying a continuous stream of material switchable from the propeller part driving material to one spout to the propeller part driving material to the other spout, a jigger for jigging a bag being filled on a spout, means for rendering the jigger inoperative when a propeller has made a predetermined number of revolutions after the switching of the stream, and means actuated by the beam for switching the stream after the jigger has been rendered inoperative.

14. In bag filling apparatus, a scale beam, two spouts mounted upon the scale beam and each adapted to enter the valve of a bag, constantly rotating propeller means having a part adapted to drive material to and through each spout, means for supplying a continuous stream of material switchable from the part driving material to one spout to the part driving material to the other spout, a lock for the scale beam, a jigger for jigging a bag being filled upon the spout, means for releasing the lock and rendering the jigger inoperative when the propeller has made a predetermined number of revolutions after switching of the stream, and means actuated by the beam for switching the stream after the lock has been released and the jigger has been rendered inoperative.

15. In bag filling apparatus, a scale beam, a spout mounted on the scale beam and adapted to enter the valve of a bag, a constantly moving propeller for driving material to and through said spout, means to deliver an intermittent stream of material to said propeller, a lock for the scale beam, means to release said lock when the propeller has made a predetermined number of revolutions after delivery of the stream has started, and means actuated by the scale for cutting off the stream to the propeller after the lock has been released.

16. In bag filling apparatus, a scale beam, a spout mounted on the scale beam and adapted to enter the valve of a bag, a constantly moving propeller for driving material to and through said spout, means to deliver an intermittent stream of material to said propeller, a jigger for a bag being filled through said spout, means rendering the jigger operative during the main filling operation, but rendering it inoperative when the propeller has made a predetermined number of revolutions after the delivery of the stream has started, and means actuated by the scale for cutting off the stream to the propeller after the jigger has been rendered inoperative.

17. In bag filling apparatus, a scale beam, a spout mounted on the scale beam and adapted to enter the valve of a bag, a constantly moving propeller for driving material to and through said spout, means to deliver an intermittent stream of material to said propeller, a lock for the scale beam, a jigger for a bag being filled through said spout, means to release the lock and render the jigger inoperative when the propeller has made a predetermined number of revolutions after delivery of the stream has started, and means actuated by the scale for cutting off the stream to the propeller after the lock has been released and the jigger has been rendered inoperative.

WILLIAM ROY PETERSON.